United States Patent
Wong et al.

(10) Patent No.: US 8,635,306 B2
(45) Date of Patent: Jan. 21, 2014

(54) SYSTEM AND METHOD FOR DISPLAY DEVICE CHARACTER INPUT

(75) Inventors: Ling Jun Wong, Escondido, CA (US); True Xiong, San Diego, CA (US)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 12/887,119

(22) Filed: Sep. 21, 2010

(65) Prior Publication Data

US 2012/0072502 A1    Mar. 22, 2012

(51) Int. Cl.
*G06F 15/16* (2006.01)

(52) U.S. Cl.
USPC ............................. 709/219; 709/217; 709/248

(58) Field of Classification Search
USPC .......................................... 709/217, 219, 248
See application file for complete search history.

(56) References Cited

U.S. PATENT DOCUMENTS

| | | | |
|---|---|---|---|
| 5,790,201 A | 8/1998 | Antos | |
| 6,040,872 A | 3/2000 | Kim | |
| 6,684,221 B1* | 1/2004 | Rejndrup | 1/1 |
| 7,912,706 B2* | 3/2011 | Sparre | 704/10 |
| 8,073,860 B2* | 12/2011 | Venkataraman et al. | 707/759 |
| 8,250,609 B1* | 8/2012 | Henty | 725/53 |
| 8,463,592 B2* | 6/2013 | Lu et al. | 704/2 |
| 2002/0165863 A1 | 11/2002 | Shoher | |
| 2003/0028609 A1* | 2/2003 | Cahill | 709/208 |
| 2004/0198435 A1* | 10/2004 | Gauld et al. | 455/556.1 |
| 2005/0235214 A1* | 10/2005 | Shimizu et al. | 715/740 |
| 2008/0201420 A1* | 8/2008 | Wong et al. | 709/204 |
| 2008/0246890 A1* | 10/2008 | Henty | 348/734 |
| 2008/0282291 A1* | 11/2008 | Henty | 725/44 |
| 2008/0297481 A1* | 12/2008 | Higginson | 345/169 |
| 2009/0054050 A1* | 2/2009 | Almeda et al. | 455/419 |
| 2009/0271700 A1* | 10/2009 | Chen et al. | 715/261 |
| 2010/0242074 A1* | 9/2010 | Rouse et al. | 725/100 |
| 2010/0269047 A1* | 10/2010 | Pahlavan et al. | 715/740 |
| 2010/0269048 A1* | 10/2010 | Pahlavan et al. | 715/740 |
| 2010/0269057 A1* | 10/2010 | Pahlavan et al. | 715/773 |
| 2010/0269152 A1* | 10/2010 | Pahlavan et al. | 726/3 |
| 2010/0306691 A1* | 12/2010 | Ardhanari et al. | 715/773 |
| 2011/0191516 A1* | 8/2011 | Xiong et al. | 710/305 |
| 2012/0013536 A1* | 1/2012 | VanDuyn et al. | 345/169 |

OTHER PUBLICATIONS

A. Latrino et al., Text Editing in Digital Terrestrial Television: a comparison of three interfaces, http://www.di.unito.it/~modeo/paper/iatrino-modeo.pdf (no date).

* cited by examiner

*Primary Examiner* — Hieu Hoang

(74) *Attorney, Agent, or Firm* — Sony Corporation

(57) ABSTRACT

Methods and apparatus are provided for providing character input to a display device. In one embodiment, a method includes detecting a user selection of an application which allows for character input by a user, launching a receiver application by the display device, and detecting a transmission from a user device by a messenger application of the display device, the transmission identifying at least one graphical character based on user operation of a user device. The method may further include displaying the at least one graphical character.

16 Claims, 3 Drawing Sheets

SYSTEM AND METHOD FOR DISPLAY DEVICE CHARACTER INPUT

FIELD OF THE INVENTION

The present invention relates generally to display devices, and more particularly to device interoperation with network services and management of device connectivity.

BACKGROUND OF THE INVENTION

Network based applications provide many services, including media sharing, social networking, entertainment, etc. With the development of web based applications, devices have been developed for network connectivity. For example, many manufactures market display devices (e.g., TV's) as enabled for network connectivity. As such, users may desire to utilize devices for networked activities such as email, browsing for content and third-party applications. One inconvenience users have is the lack of a convenient keyboard. Many display devices and user interfaces employ a software keyboard, such as a displayed character set for selection of one or more characters. However, this method of providing characters is inconvenient as it requires a user to navigate to each character. Another option is to employ a Bluetooth™ keyboard. This, however, requires a Bluetooth™ capability for the display device and results in added cost. What is desired is a solution that allows for providing character input via a communication network employing network capability functions of a display device.

BRIEF SUMMARY OF THE INVENTION

Disclosed and claimed herein are methods and apparatus for providing character input to a display device. In one embodiment, a method includes detecting, by the display device, a user selection of an application which allows for character input by a user, launching a receiver application by the display device, detecting a transmission from a user device by a messenger application of the display device, the transmission indentifying at least one graphical character based on user operation of a user device, and displaying, by the display device, the at least one graphical character.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 2:
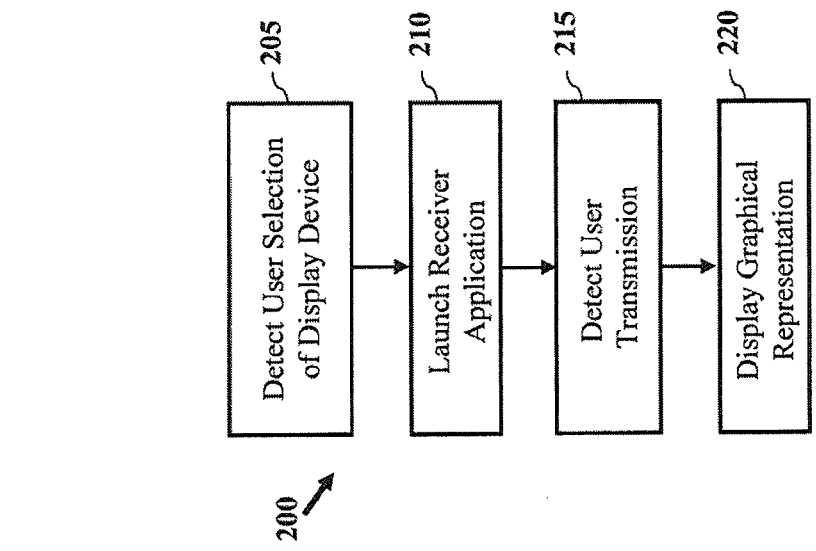
FIG. 2 depicts a process for providing character input to a display device according to one embodiment of the invention.

One aspect of the present invention relates to providing character input to a display device. In one embodiment, a system and methods are provided for a user to communication with a display device via a communication network. A system may be provided that allows a user to provide character input via a communication network employing network capability functions of a display device. In one embodiment, the system may include a display device configured to provide a receiver application and messenger application. The receiver application may be configured to interface with one or more applications of the display device. The messenger application may be configured to receive character or text data from a source application executed by a user device via a communication network.

According to another embodiment, a process is provided for providing character input from a user device to a display device via a communication network. The process may include launching a receiver application and displaying a graphical representation of graphical characters received from a user device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Figure 1:
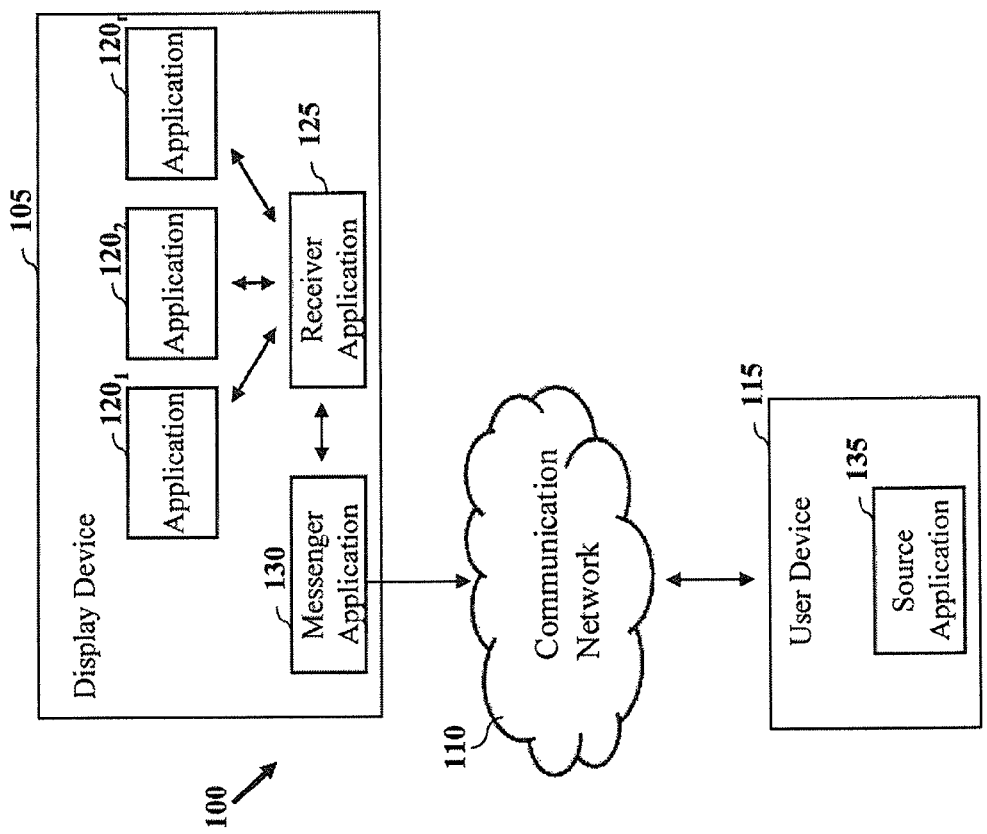
FIG. 1 depicts a simplified system diagram according to one embodiment of the invention.

Referring now to the figures, FIG. 1 depicts a simplified system diagram according to one or more embodiments of the invention. In one embodiment, system 100 may be provided for providing character input to a display device. In particular, system 100 may be employed to provide one or more characters to a display device via a user device, (e.g., computer, smart phone, etc.). In particular, the buttons or keypad of a user device may be employed for providing one or more characters. According to one embodiment, characters may be provided to a display device via a communication network. As depicted in FIG. 1, system 100 includes display device 105, communication network 110, and user device 115.

Display device 105 may be configured to provide one or more of audio and video output based on data received from a broadcast source and/or input terminal of the device. According to one embodiment, display device 105 may be configured for communication via network 110. For example, display device 105 may be configured to transmit and request data to one or more network addressable locations. As will be discussed in more detail with respect to FIG. 3 below, display device may include a processor configured to execute one or more applications.

As depicted in FIG. 1, display device 105 includes a plurality of applications shown as $120_{1-n}$. Applications $120_{1-n}$ may relate to one or more of programs for providing network based services. For example, an application may allow for one or more of internet browsing, internet searching, social networking, media viewing, news, entertainment and network based applications in general. One advantage of system 100 may be provided by allowing a user to enter text and/or character input for operation of applications $120_{1-n}$ via device 115 and communication network 110. In that fashion, short range wireless communication capabilities of the display device with peripheral controllers (e.g., Bluetooth™, infrared, etc.) may be avoided. Moreover, network capabilities of a device may be employed. In one embodiment, user selection of an application, such as application 120 may result in display device 105 launching a receiver application shown as 125. Receiver application 125 may be configured to communicate with messenger application 130 to provide text and/or character information to application 120, based on data transmitted by source application 135.

According to one embodiment, messenger application 130 may provide an interface for source application 135 and one or more destination applications $120_{1-n}$. Messenger application 130 may provide an application programming interface (API) for source application 135 to send characters to display device 105. The messenger application of the display device may be associated with a network address of a communication network. According to another embodiment, messenger application 130 may relate to a server which processes incoming traffic via communication network 110 for display device 105.

Source application 135 may reside on user device 115. User device 115 may include one or more buttons (e.g., keypad, keyboard, soft keys, etc.) that may be configured for a user to enter characters. Based on characters selected by a user, source application 135 may be configured to transmit a single character, a series of characters, and/or words to messenger application 130 via communication network 110. In one embodiment, messenger application 130 may provide character data to receiver application 125 only when the receiver application is active. For example, receiver application 125 may only be active, that is willing to accept character data, when an application such as application $120_1$, has called the receiver application to launch.

Communication network 110 may allow for one or more of wired and wireless communication. For example, communication network may allow for network based communications including but not limited to LAN, WAN, WI-FI, etc.

User device 115 may relate to personal computer or device configured to execute an application and communicate via communication network 110. In one embodiment, user device 115 may include or be configured to receive character data from a user via an attached keyboard or keypad. Source application 135 may be configured to detect user selection of character input and one or more buttons for transmitting character input to display device 105.

Referring now to FIG. 2, a process is depicted for providing character input to the display device of FIG. 1 according to one or more embodiments of the invention. Process 200 may be employed for providing a graphical display of one or more characters based on a user transmission via a communication network to a display device. Process 200 may be initiated by detecting a user selection of the display device at block 205. The user selection may relate to selection of an application associated with one or more of electronic mail, internet searching, social networking, searching a network site, and entertainment. In one embodiment, one or more or a graphical menu, displayed element, launching of an application, or even selection of an interface of an application provided by the display device may be selected by a user for entering text. The selection may be performed by a user operating one or more of a remote control, button of the display device, and in certain instances via a user device (e.g., user device 115).

Based on the user selection, the display device may launch a receiver application at block 210. The receiver application may relate to an application that provides graphical character data to the user selected application. The display device may then detect a user transmission at block 215. User transmissions may be detected by a messenger application (e.g., messenger application 130) of the display device. The transmission received by the messenger application may be detected based on an application programming interface established between a source application of the user device and the messenger application of the display device. Based on detected user transmission at block 215, the display device may display a graphical presentation of the characters at block 220. The graphical display of at least one graphical character may be based on decoding of the transmission by the receiver application for at least one application associated with the user selection.

In one embodiment, the receiver application of a display device may be configured to convert data received by a messenger application into a format that may be employed by an application (e.g., application $120_1$) for display of the character(s). Display of the at least one graphical character may relate to displaying one or more characters received from the user device via a communication network. In certain embodiments the user transmission may relate to a single character. In other embodiments, a user transmission may relate to a plurality of characters including a string of words and/or characters. In certain embodiments, the receiver application may be configured to instruct the messenger application to listen for user transmissions while an application is being operated by a user. Process 200 may further include detecting additional transmissions from the user device, and displaying graphical character data based on the at least one additional transmission.

Although, process 200 has been described above with reference to character and text input, it should be appreciated that other types of data and or files may be transmitted by a device based on process 200.

Figure 3:
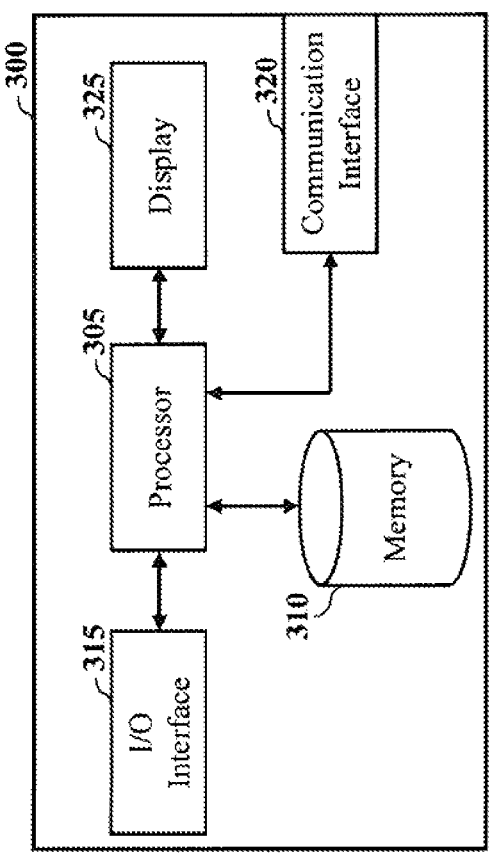
FIG. 3 depicts a simplified block diagram of a device according to one embodiment of the invention.

FIG. 3 depicts a simplified block diagram of a device according to one embodiment of the invention. In one embodiment, device 300 relates to the display device of FIG. 1. Device 300 may be configured to output audio and/or video. As depicted in FIG. 3, device 300 includes processor 305, memory 310, input/output (I/O) interface 315, network communication interface 320 and display 325. Processor 305 may be configured to control operation of device 300 based on one or more computer executable instructions stored in memory 310. Memory 310 may relate to one of RAM and ROM memories and may be configured to store one or more media files, content, and computer executable instructions for operation of device 300. Processor 305 may additionally be configured to execute one or more applications.

I/O interface 315 may include one or more buttons for user input, such as a numerical keypad, volume control, channel control, menu controls, pointing device, track ball, mode selection buttons, and playback functionality (e.g., play, stop, pause, forward, reverse, slow motion, etc). Buttons of I/O interface 315 may include hard and soft buttons, wherein functionality of the soft buttons may be based on one or more applications running on device 300. I/O interface 315 may be configured to allow for one or more devices to communicate with device 300 via wired or wireless communication. I/O interface 315 may include one or more ports for receiving data, including ports for removable memory.

Network communication interface 320 may be configured to allow for network based communications including but not limited to LAN, WAN, Wi-Fi, etc. In one embodiment, communication interface 320 may be configured to provide a messenger application (e.g., messenger application 130). Display 325 may be employed to display video data and display one or more applications executed by processor 305.

Figure 4:
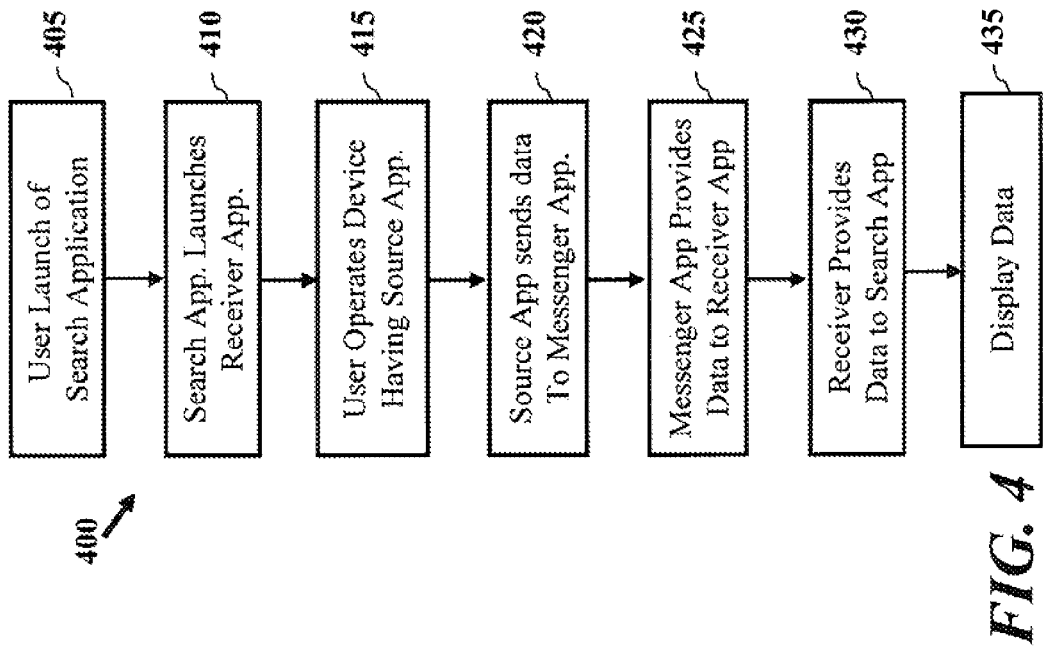
FIG. 4 depicts a process for providing character input to a display device according to another embodiment of the invention.

Referring now to FIG. 4, a process is depicted for providing character input for a display device. In one embodiment, process 400 may be performed by a user device in communication with a display device via a communication network. Although network communication may be typically performed for communication of data over a distance, it may be appreciated that a users home network may be employed for transmitting data relative to a display device and a user device. Process 400 may be initiated at block 405 based on a user launching a search application (e.g., application 120$_{1-n}$ on a display device. The user may launch the search application using controls of the display device. According to another embodiment, a user device may include a terminal or button which may selected by the user to initiate communication of character or text data the communication device with the display device. At block 410, the search application may launch a receiver application. Launch of the receiver application may be performed when a particular application allows for text to be entered by the user.

At block 415 a user may operate a device having a source application (e.g., source application 135). For example, the user may type on a key pad of a user device having the source application. The source application may be configured to transmit one or more characters to a messenger application of the display device at block 420. The messenger application may be configured to provide the identified character data to a receiver application at block 425. In certain embodiments, data provided to the receiver application is provided only when the receiver application has been called by another application, such as a search application. The receiver application may provide data to, a search application at block 430. The display device may then display the received characters by providing a graphical display of the characters at block 435.

Figure 5:
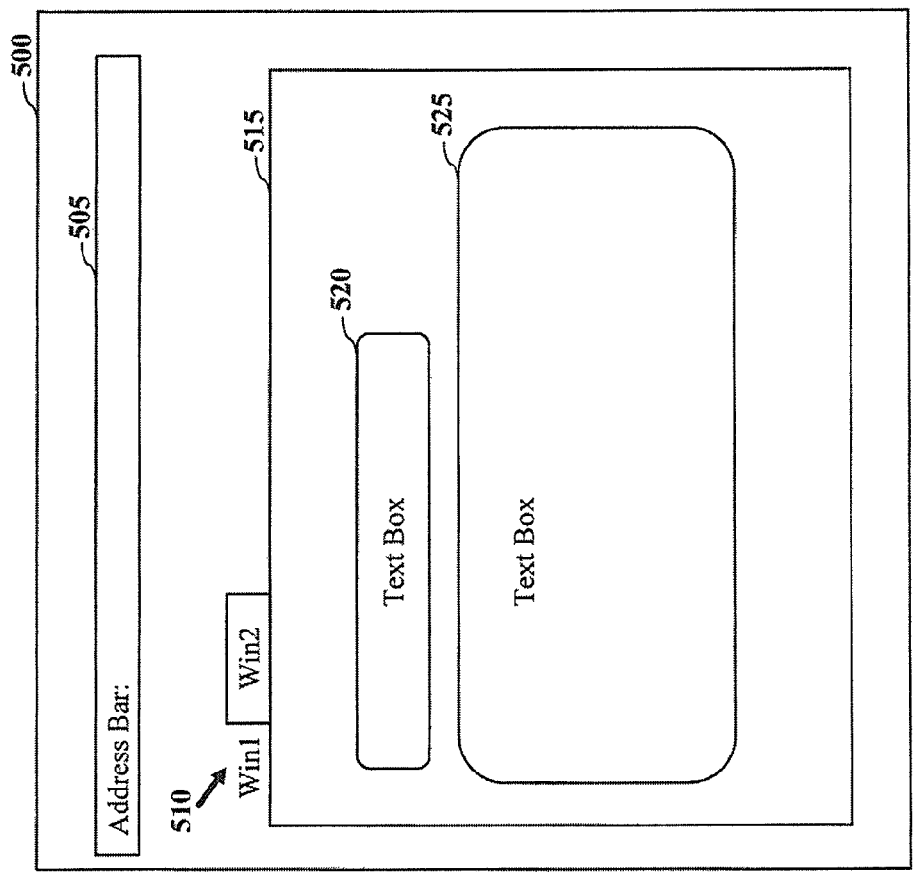
FIG. 5 depicts a graphical representation of an application provided by a display device according to one or more embodiments of the invention.

Referring now to FIG. 5, a graphical representation is depicted of a user interface of a an application provided by a display device. User interface 500 relates to a interne browsing application according to one or more embodiments of the invention. User interface 500 may be displayed by a display device (e.g., display device 105). As shown, user interface 500 includes address bar 505, and one or more selectable windows depicted as 510. The browser application may include display panel 515 including one or more areas in which a user may enter text. As depicted, window 515 includes text box 520 and text box 525. Layout of the browser application may be based on the browser, however, providing input to a browser, such as characters to type may be provided by a user device via a network communication.

Figure 6:
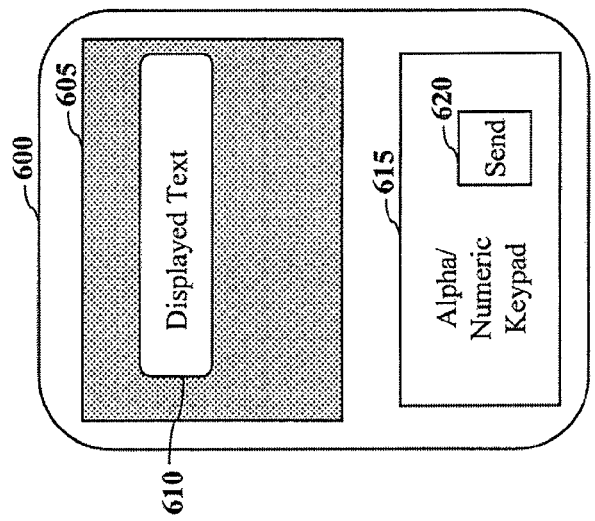
FIG. 6 depicts a graphical representation of a user device according to one embodiment of the invention.

Referring now to FIG. 6, a graphical representation is depicted of a user device according to one embodiment of the invention. User device 600 includes display 605 and may be configured to provide graphical display of one or more characters. In one embodiment display 605 may be configured to display one or more characters selected by a user for a source application to transmit, shown via text box 610. According to another embodiment, user device includes alpha numeric keypad 615. Keypad 615 may include one or more buttons, such as send button 620 for transmitting user selected characters. In that fashion a user may transmit characters to a display device.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for providing character input to a display device, the method:
    detecting, by the display device, a user selection of an application which allows for character input by a user, the application associated with at least one of electronic mail, internet searching, social networking, searching a network site, and entertainment;
    launching a receiver application by the display device in response to detecting the user selection of the application that allows character input;
    instructing, by the receiver application of the display device, a messenger application to detect for a transmission relating to one or more character inputs from a user device different from the display device while the application is being operated by the user;
    detecting the transmission from the a user device by the messenger application of the display device, wherein the receiver application decodes the transmission to identify at least one graphical character for display and provide the at least one graphical character to the application on the display device; and
    displaying, by the display device, the at least one graphical character.

2. The method of claim 1, wherein the transmission received by the messenger application is detected based on an application programming interface established between a source application of the user device and the messenger application of the display device.

3. The method of claim 1, wherein display of the at least one graphical character relates to displaying a single character, a series of characters, or one or more words received from the user device via a communication network.

4. The method of claim 1, wherein the messenger application of the display device is associated with a network address of a communication network.

5. The method of claim 1, further comprising detecting an additional transmission from the user device, and displaying graphical character data based on the at least one additional transmission.

6. A non-transitory computer-readable storage medium having stored thereon, a computer program having at least one code section for communication, the at least one code section being executable by a display device for causing the display device to perform steps comprising:
    detecting a user selection of an application which allows for character input by a user, the application associated with at least one of electronic mail, internet searching, social networking, searching a network site, and entertainment;
    launching a receiver application by the display device in response to detecting the user selection of the application;
    instructing, by the receiver application of the display device, a messenger application to detect for a transmission relating to one or more character inputs from a user device different from the display device while the application is being operated by the user;
    detecting the transmission from the user device by the messenger application of the display device, wherein the receiver application decodes the transmission to identify at least one graphical character for display and provide the at least one graphical character to the application on the display device; and
    displaying the at least one graphical character.

7. The non-transitory computer-readable storage medium of claim 6, wherein the transmission received by the messenger application is detected based on an application programming interface established between a source application of the user device and the messenger application of the display device.

8. The non-transitory computer-readable storage medium of claim 6, wherein display of the at least one graphical character relates to displaying one or more characters received from the user device via a communication network.

9. The non-transitory computer-readable storage medium of claim 6, wherein the messenger application of the display device is associated with a network address of a communication network.

10. The non-transitory computer-readable storage medium of claim 6, further comprising computer readable code to detect an additional transmission from the user device, and display graphical character data based on the at least one additional transmission.

11. A system comprising:
    a user device; and
    a display device operable to receive data from the user device via a communication network, the display device operable to:
    detect a user selection of an application which allows for character input by a user, the application associated with at least one of electronic mail, internet searching, social networking, searching a network site, and entertainment;
    launch a receiver application by the display device in response to detecting the user selection of the application;
    instructing, by the receiver application of the display device, a messenger application to detect for a transmission relating to one or more character inputs from a user device different from the display device while the application is being operated by the user;
    detect the transmission from the user device by the messenger application of the display device, wherein the receiver application decodes the transmission to identify at least one graphical character for display and provide the at least one graphical character to the application on the display device; and
    display the at least one graphical character.

12. The system of claim 11, wherein the transmission, received by the messenger application is detected based on an application programming interface established between a source application of the user device and the messenger application of the display device.

13. The system of claim 11, wherein display of the at least one graphical character relates to displaying one or more characters received from the user device via a communication network.

14. The system of claim 11, wherein the messenger application of the display device is associated with a network address of a communication network.

15. The system of claim 11, further comprising detecting an additional transmission from the user device, and displaying graphical character data based on the at least one additional transmission.

16. The method of claim 1, wherein the receiver application accepts the graphical character data from the messenger application when the selected application launches the receiver application.

* * * * *